Patented Sept. 1, 1931

1,821,257

UNITED STATES PATENT OFFICE

RAINALD BRIGHTMAN AND PERCY CHORLEY, OF BLACKLEY, MANCHESTER, ENGLAND, ASSIGNORS TO BRITISH DYESTUFFS CORPORATION LIMITED, OF BLACKLEY, MANCHESTER, ENGLAND

MANUFACTURE OF AZO DYESTUFFS

No Drawing. Original application filed April 16, 1928, Serial No. 270,572, and in Great Britain April 22, 1927. Divided and this application filed August 24, 1929. Serial No. 388,261.

In our application Serial No. 270,572, of which the present application is a division, we disclose processes of making new and valuable azo dyestuffs by combining a tetrazotized 4:4'-diaminodiphenyl mono- di- or tri-sulphide with two molecules of suitable end components of which at least one is or contains an amino naphthol sulphonic acid including in this term the N-substituted derivatives thereof, directly coupled with the diaminodiphenyl sulphide residue. The other coupling component may be any of the known coupling components and either coupling component may contain an azo group. These dyestuffs are represented by the following general formula

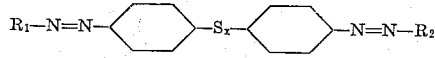

wherein $R_1$ represents a coupling component, $R_2$ represents an aminonaphthol sulphonic acid and $x$ is an integer greater than 0 and less than 4.

The present invention relates to processes of making a certain group of dyestuffs of the broad general class disclosed in our above-mentioned application, namely that group of dyestuffs in which salicylic acid is used as a coupling component. This group of dyestuffs has the following general formula

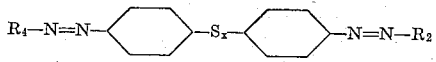

wherein $x$ is an integer greater than 0 and less than 4, $R_4$ represents a coupled salicylic acid and $R_2$ represents a coupled aminonaphthol sulphonic acid, including in this term the N-substituted derivatives thereof. We have found that especially advantageous dyestuffs are produced when the N-substituent is an acyl or monocyclic group.

The dyestuffs of the present invention are very useful for dyeing regenerated cellulose materials, in even level shades.

Regenerated cellulose materials such as viscose silks are now being used in ever increasing amounts. These materials are difficult to dye in the even level shades required in a commercial satisfactory product. The dyeing of regenerated cellulose materials is an important technical and industrial problem which has only been partially solved. The dyestuffs of the present invention offer a means for advancing the solution of this problem. They produce very excellent even level shades on regenerated cellulose material.

We found that dyestuffs having the above-mentioned characteristic structure may be prepared by combining a tetrazotized 4:4'-diaminodiphenyl mono- di- or tri-sulphide with one molecular proportion of salicylic acid and one molecular proportion of an aminonaphthol sulphonic acid. This is the process which we set forth and claim in the present application. These dyestuffs may also be prepared by another method as set forth in the application of one of us, Rainald Brightman Serial No. 262,048. In that application there is disclosed a process which comprises combining a diazotized 4-nitro-4'-aminodiphenyl sulphide with salicylic acid, reducing the nitro group of the resultant dyestuff by means of sodium sulphide, diazotizing the amino body thus obtained and combining it with an aminonaphthol sulphonic acid. The dyestuffs produced by such a method are of the same general type as herein disclosed.

The following examples are illustrative of the processes employed in the present invention and in no way limit the scope of the invention.

*Example 1.*—216 parts of 4:4'-diaminodiphenyl sulphide are tetrazotized with 138 parts of sodium nitrite and 500 parts of 36 per cent hydrochloric acid and the solution of tetrazo compound is stirred into a solution of 138 parts of salicylic acid in 40 parts of sodium hydroxide and 400 parts of sodium carbonate. The mixture is stirred until coupling is complete when a solution of 337 parts of the sodium salt of 2-phenylamino-8-naphthol-6-sulphonic acid is added. Stirring is continued until combination is complete, when the mixture is heated up and the dyestuff isolated by the addition of common salt. It forms a dark powder which is soluble in sulphuric acid to violet-blue colored solutions, and in water to brown solutions, and which dyes viscose silk a brown shade and wool in brown shades, fast to milling. It is identical with the dyestuffs prepared from 4-nitro-4'-aminodiphenyl sulphide as described in Example 5 of our co-pending application Serial No. 262,048. If in place of the 2-phenylamino-8-naphthol-6-sulphonic acid in the above example, we use a solution of 239 parts of 2-amino-8-naphthol-6-sulphonic acid, we obtain a dyestuff giving red-brown dyeings on viscose silk.

*Example 2.*—To a solution of 138 parts of salicylic acid in 40 parts of sodium hydroxide and 400 parts of sodium carbonate there is added the tetrazo solution obtained from 216 parts of 4:4'-diaminodiphenyl sulphide and 138 parts of sodium nitrite in the usual way. The mixture is kept cold and stirred until coupling is complete when there is added a neutral solution of the aminoazo compound obtained by combining 138 parts of diazotized *p*-nitroaniline with 319 parts of 1-amino-8-naphthol-3:6-disulphonic acid in mineral acid solution in the known way. The mixture is maintained alkaline and stirred until coupling is complete when it is heated and the dyestuff isolated by the addition of common salt. It forms a dark lustrous powder which is soluble in sulphuric acid to dull violet-grey colored solutions, and in water to green solutions. It dyes viscose silk a dark green shade. If in place of 216 parts of 4:4'-diaminodiphenyl sulphide there are used 280 parts of 4:4'-diaminodiphenyl trisulphide, we obtain a dyestuff giving bright bluish-green shades on viscose silk.

*Example 3.*—280 parts of 4:4'-diaminodiphenyl trisulphide are tetrazotized in the presence of ice with 138 parts of sodium nitrite and 500 parts of 36 per cent hydrochloric acid. The tetrazo-compound partly separates and the yellow suspension is run into a solution of 138 parts of salicylic acid in 40 parts of sodium hydroxide and 400 parts of sodium carbonate. After stirring until coupling is complete there is added a neutral solution of 239 parts of 2-amino-5-naphthol-7-sulphonic acid. The mixture is stirred until coupling is complete when it is heated up and the dyestuff precipitated by the addition of common salt. It forms a reddish-brown powder which is soluble in sulphuric acid to violet colored solutions, and in water to orange-red solutions. It dyes viscose silk an orange shade.

*Example 4.*—216 parts of 4:4'-diaminodiphenyl sulphide are tetrazotized and combined with 138 parts of salicylic acid in alkaline (sodium carbonate) solution. After stirring about half an hour a solution containing 315 parts of 2-phenylamino-5-naphthol-7-sulphonic acid is added and the mixture maintained alkaline and stirred until coupling is complete. It is then heated up and the dyestuff isolated by the addition of common salt. It forms a reddish-brown powder giving a violet-blue colored solution in concentrated sulphuric acid, turning redder and ultimately affording a reddish-brown precipitate on dilution, and soluble in water to a brown solution substantially unchanged on addition of alkali and yielding a reddish-brown precipitate on addition of mineral acids. It dyes viscose silk a red shade.

In the following table we set forth further examples of dyestuffs of the broad general class to which our present invention relates. In the last column of this table there is set forth the shade on viscose silk produced by these dyestuffs.

| Diamine | First coupling component | Second coupling component | Shade on viscose silk |
|---|---|---|---|
| 4:4'-diamino-diphenyl monosulphide. | Salicylic acid. | 2-acetamino-8-naphthol-6-sulphonic acid. | Scarlet. |
| ditto | ditto | 2-amino-8-naphthol-6-sulphonic acid (acid coupled). | ditto. |
| 4:4'-diamino-diphenyl trisulphide. | Salicylic acid. | 2-amino-8-naphthol-6-sulphonic acid. | Reddish-brown. |
| ditto | ditto | 2-acetamino-8-naphthol-6-sulphonic acid. | Yellowish red. |
| ditto | ditto | 2-m-xylylamino-8-naphthol-6-sulphonic acid. | Brown. |

What we claim and desire to secure by Letters Patent is:

1. In the manufacture of new azo dyes the process which comprises tetrazotizing a diamine of the formula

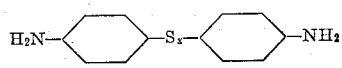

wherein $x$ is an integer greater than 0 and less than 4, and coupling the tetrazo compound so produced with one molecular proportion of salicylic acid and one molecular proportion of an aminonaphthol sulphonic acid.

2. In the manufacture of new azo dyes the process which comprises tetrazotizing a diamine of the formula

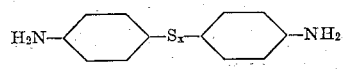

wherein $x$ is an integer greater than 0 and less than 4, and coupling the tetrazo compound so produced with one molecular proportion of salicylic acid and one molecular proportion of an aminonaphthol sulphonic acid of the type

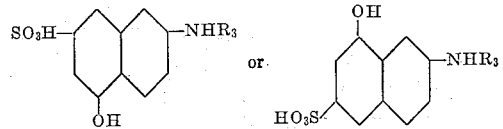

wherein $R_3$ represents hydrogen, an acyl group or a monocyclic group.

3. In the manufacture of new azo dyes, the process which comprises tetrazotizing a diamine of the formula

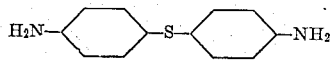

and coupling the tetrazo compound so produced with one molecular proportion of salicylic acid and one molecular proportion of an aminonaphthol sulphonic acid.

4. In the manufacture of new azo dyes, the process which comprises tetrazotizing a diamine of the formula

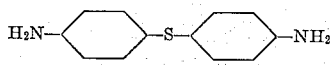

and coupling the tetrazo compound so produced with one molecular proportion of salicylic acid and one molecular proportion of an aminonaphthol sulphonic acid of the type

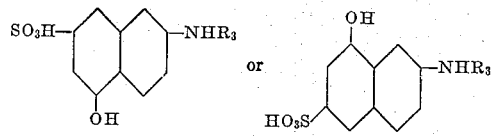

wherein $R_3$ represents hydrogen, an acyl group, or a monocyclic aryl group.

5. In the manufacture of new azo dyes, the process which comprises tetrazotizing a diamine of the formula

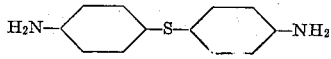

and coupling the tetrazo compound so produced with one molecular proportion of salicylic acid and one molecular proportion of an aminonaphthol sulphonic acid of the type

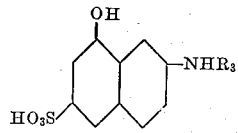

wherein $R_3$ represents hydrogen, an acyl group, or a monocyclic aryl group.

6. In the manufacture of new azo dyes, the process which comprises tetrazotizing a diamine of the formula

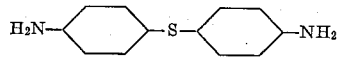

and coupling the tetrazo compound so produced with one molecular proportion of salicylic acid and one molecular proportion of a 2:8-aminonaphthol sulphonic acid of the type

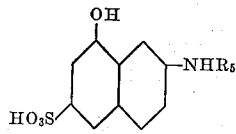

wherein $R_5$ represents a monocyclic aryl group.

7. In the manufacture of new azo dyes, the process which comprises tetrazotizing a diamine of the formula

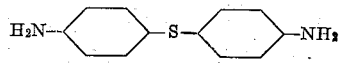

and coupling the tetrazo compound so produced with one molecular proportion of salicylic acid and one molecular proportion of 2-phenylamino-8-naphthol-6-sulphonic acid.

8. New azo dyes having the probable general formula

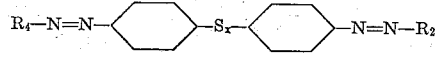

wherein $x$ is an integer greater than 0 and less than 4, $R_4$ represents a coupled salicylic acid and $R_2$ represents a coupled aminonaphthol sulphonic acid, said dyes being soluble in concentrated sulphuric acid and in water and dyeing viscose silk in even level shades.

9. New azo dyes having the probable general formula

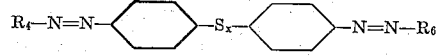

wherein $x$ is an integer greater than 0 and less than 4, $R_4$ represents a coupled salicylic acid and $R_6$ represents a coupled aminonaphthol sulphonic acid of the type

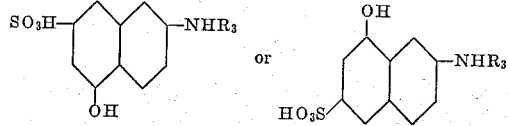

wherein $R_3$ represents hydrogen, an acyl group, or a monocyclic aryl group.

10. New azo dyes having the probable general formula

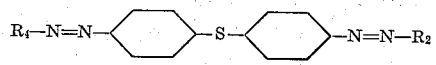

wherein $R_4$ represents a coupled salicylic acid and $R_2$ represents a coupled aminonaphthol sulphonic acid, the said dyes being soluble in concentrated sulphuric acid and in water and dyeing viscose silk in even level shades.

11. New azo dyes having the probable general formula

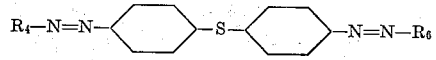

wherein $R_4$ represents a coupled salicylic acid and $R_6$ represents a coupled aminonaphthol sulphonic acid of the type

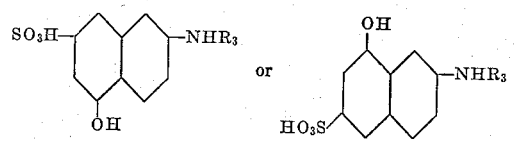

wherein $R_3$ represents hydrogen, an acyl group or monocyclic aryl group, the said dyes being soluble in concentrated sulphuric acid and in water and dyeing viscose silk in even level shades.

12. New azo dyes having the probable general formula $$R_4-N=N-\langle\phantom{xx}\rangle-S-\langle\phantom{xx}\rangle-N=N-R_7$$

wherein $R_4$ represents a coupled salicylic acid and $R_7$ represents a coupled aminonaphthol sulphonic acid of the type

[structure: naphthalene with OH, $HO_3S$—, and —$NHR_3$ substituents]

wherein $R_3$ represents hydrogen, an acyl group or a monocyclic aryl group, said dyes being soluble in concentrated sulphuric acid and in water and dyeing viscose silk in even level shades.

13. New azo dyes having the probable general formula $$R_4-N=N-\langle\phantom{xx}\rangle-S-\langle\phantom{xx}\rangle-N=N-R_1$$

wherein $R_4$ represents a coupled salicylic acid and $R_8$ represents a coupled 2:8-aminonaphthol sulphonic acid of the type

[structure: naphthalene with OH, $HO_3S$—, and —$NHR_5$ substituents]

wherein $R_5$ represents a monocyclic aryl group, the said dyes being soluble in concentrated sulphuric acid and in water and dyeing viscose silk in even level shades.

14. New azo dye having the formula $$R_4-N=N-\langle\phantom{xx}\rangle-S-\langle\phantom{xx}\rangle-N=N-R_9$$

wherein $R_4$ represents a coupled salicylic acid and $R_9$ represents a coupled 2-phenylamino-8-naphthol-6-sulphonic acid, the said dye being a dark powder which is soluble in sulphuric acid to violet-blue solutions, and in water to brown solutions, and which dyes viscose silk an even level brown shade.

15. In the manufacture of new azo dyes, the process which comprises tetrazotizing a diamine of the formula $$H_2N-\langle\phantom{xx}\rangle-S-\langle\phantom{xx}\rangle-NH_2$$

and coupling the tetrazo compound so formed with one molecular proportion of salicylic acid and one molecular proportion of an aminonaphthol sulphonic acid of the type

[structure: naphthalene with $HO_3S$—, —$NHR_3$, and OH substituents]

wherein $R_3$ represents hydrogen, an acyl group or a monocyclic aryl group.

16. New azo dyes having the probable formula $$R_4-N=N-\langle\phantom{xx}\rangle-S-\langle\phantom{xx}\rangle-N=N-R_7$$

wherein $R_4$ represents a coupled salicylic acid and $R_7$ represents a coupled aminonaphthol sulphonic acid of the type

[structure: naphthalene with $HO_3S$—, —$NHR_3$, and OH substituents]

wherein $R_3$ represents hydrogen, an acyl group or a monocyclic aryl group, said dyes being soluble in concentrated sulphuric acid and in water and dyeing viscose silk in even level shades.

In testimony whereof we affix our signatures.

RAINALD BRIGHTMAN.
PERCY CHORLEY.